US012765578B2

(12) United States Patent
Drouillard et al.

(10) Patent No.: US 12,765,578 B2
(45) Date of Patent: Oct. 20, 2026

(54) FEED BLOCK PRODUCTION METHOD USING VACUUM PRESSURE

(71) Applicant: BetterFedFoods LLC, Wamego, KS (US)

(72) Inventors: James S. Drouillard, Olsburg, KS (US); Gabriel Porcel Zylberlicht, Campinas (BR)

(73) Assignee: BetterFedFoods LLC, Wamego, KS (US)

( * ) Notice: Subject to any disclaimer, the term of this patent is extended or adjusted under 35 U.S.C. 154(b) by 0 days.

(21) Appl. No.: 18/992,258

(22) PCT Filed: Sep. 20, 2023

(86) PCT No.: PCT/US2023/074651
§ 371 (c)(1),
(2) Date: Jan. 8, 2025

(87) PCT Pub. No.: WO2024/073279
PCT Pub. Date: Apr. 4, 2024

(65) Prior Publication Data

US 2025/0160368 A1 May 22, 2025

Related U.S. Application Data

(60) Provisional application No. 63/479,302, filed on Jan. 10, 2023, provisional application No. 63/377,126, filed on Sep. 26, 2022.

(51) Int. Cl.
*A23K 40/20* (2016.01)
*A23K 10/38* (2016.01)

(52) U.S. Cl.
CPC .............. *A23K 40/20* (2016.05); *A23K 10/38* (2016.05)

(58) Field of Classification Search
CPC ...................................................... A23K 10/38
See application file for complete search history.

(56) References Cited

U.S. PATENT DOCUMENTS 1,983,434 A 12/1934 Black et al.
2,089,062 A 8/1937 Hougland
(Continued)

FOREIGN PATENT DOCUMENTS

CN 101791069 A 8/2010
EP 1726214 A1 11/2006
(Continued)

OTHER PUBLICATIONS

Atherton et al. (CN 101190004 Machine Translation) Apr. 18, 2012 (Year: 2012).*
(Continued)

*Primary Examiner* — Felicia C Turner
(74) *Attorney, Agent, or Firm* — Coughlin Law Office LLC; Stuart M. Aller; Daniel J. Coughlin

(57) ABSTRACT

An automated system (100) for producing animal feed blocks is disclosed. A sealable vessel (110) supported by a load cell (114,116) contains a liquid ingredient. Steps of agitating with an agitator (142), applying a continuous high vacuum, and heating with a steam jacket (128) having multiple heat zones occur upon the liquid ingredient. A controller (164) monitors the weight change of the liquid ingredient being concentrated. A target weight signal generates once the concentrated liquid ingredient corresponds to a target weight value. Dry premix (120) is mixed at a regulated amount with the concentrated liquid ingredient during agitation and application of an intermittent high vacuum. A product outlet valve (138) is positioned at an outlet (136) within a conical-shaped bottom section (134) of the sealable vessel. Compressed air from a pneumatic pump
(Continued)

(170) facilitates dispensing a quantified amount of an animal feed composition from the outlet into final packaging (140).

22 Claims, 3 Drawing Sheets

(56) References Cited

U.S. PATENT DOCUMENTS

| | | | | |
|---|---|---|---|---|
| 3,880,668 | A | 4/1975 | Miller | |
| 3,932,736 | A | 1/1976 | Zarow et al. | |
| 3,961,081 | A | 6/1976 | McKenzie | |
| 4,631,192 | A * | 12/1986 | Mommer | A23K 20/24 426/519 |
| 4,737,377 | A | 4/1988 | Lane et al. | |
| 4,759,578 | A | 7/1988 | Benton et al. | |
| 5,622,739 | A | 4/1997 | Benton et al. | |
| 6,440,478 | B1 * | 8/2002 | Benton | A23K 10/40 426/233 |
| 6,726,941 | B2 | 4/2004 | Ethington, Jr. et al. | |
| 7,045,165 | B2 | 5/2006 | Westberg | |
| 8,758,843 | B1 | 6/2014 | Hillyer et al. | |
| 9,155,325 | B2 | 10/2015 | Rapstine | |
| 12,134,091 | B2 | 11/2024 | Frankel et al. | |
| 2004/0000069 | A1 * | 1/2004 | Gurol | B02C 13/18 34/592 |
| 2006/0112889 | A1 | 6/2006 | Robbins | |
| 2009/0181126 | A1 * | 7/2009 | Wicking | A23K 20/189 426/624 |
| 2009/0272334 | A1 | 11/2009 | Robbins | |
| 2010/0233321 | A1 | 9/2010 | Drouillard et al. | |
| 2016/0010165 | A1 * | 1/2016 | Rowe | C13B 50/02 127/30 |
| 2016/0366907 | A1 | 12/2016 | Dhuyvetter et al. | |
| 2021/0076705 | A1 | 3/2021 | Geremia et al. | |
| 2021/0121486 | A1 | 4/2021 | Geremia et al. | |
| 2021/0368826 | A1 | 12/2021 | Burr et al. | |

FOREIGN PATENT DOCUMENTS

| | | | | | |
|---|---|---|---|---|---|
| EP | 1927291 | A1 | | 6/2008 | |
| GB | 2434732 | A | * | 8/2007 | A23K 10/33 |
| JP | H09154559 | A | | 6/1997 | |
| WO | 2002220000 | A1 | * | 6/2002 | B65B 31/00 |
| WO | 2004021801 | A1 | | 3/2004 | |

OTHER PUBLICATIONS

Baki Aliç TR-202008495-A1 Turkey Oct. 21, 2020 (Year: 2020).*

Kanobooring KK, Feed production unit and production of feed, this is a machine translation of a foreign patent originally published as JPH09154559 on Jun. 17, 1997, 4 pages, Japan Patent Office, Japan, Google Patents, https:// patents.google.com/patent/JPH09154559A/en?oq=JPH09154559.

Institute Animal Science and Veterinary Medicine of Shandong AAS, Novel high-energy molasses lick block and preparation method thereof, this is a machine translation of a foreign patent originally published as CN101791069A on Aug. 4, 2010, 5 pages, China National Intellectual Property Administration, China, Google Patents, https://patents.google.com/patent/CN101791069A/en?oq=CN101791069.

L. Nabilah Aminah and a Siti Nurfadilah, Assessment of Mineral Block that use Potato Starch as Binder, Proceedings of MUCET2010, Jun. 28, 2010, 4 pages, MUCET2010, Malaysian Technical Universities Conference on Engineering and Technology, Melaka, Malaysia.

Harinder Makhar, Frequently asked questions on Urea-Molasses-Multinutrient Block Technology (UMMB), as early as Jan. 6, 2021, 16 pages, Animal Production and Health Section, Joint FAO/IAEA Division, International Atomic Energy Agency, Vienna, Austria.

Harinder P.S. Makhar, Feed supplementation block technology—past, present and future, Feed Supplementation Blocks—Urea-Molasses Multi-Nutrient Blocks: simple and effective feed supplement technology for ruminant agriculture, FAO Animal Production and Health, as early as 2007, 40 pages, issue 164, ISBN 978-92-5-105438-3, Food and Agriculture Organization of the United Nations, Rome, Italy.

USDA Farm Service Agency, USDA's Domestic Sugar Program and Reporting Glossary Terms, as early as Jan. 6, 2021, 6 pages, U.S. Department of Agriculture, https://www.fsa.usda.gov/Internet/FSA_File/sugar_glossary.pdf.

Shane Thomas, Written Opinion of the International Searching Authority, Notification of Transmittal of the International Search Report and the Written Opinion of the International Searching Authority, or the Declaration, Dec. 4, 2023, 24 pages, International Searching Authority/United States, Alexandria, Virginia, United States of America.

International Search Report and Written Opinion from Int'l Pat. App. PCT/US2023/074651, Jan. 11, 2024 (6 pp.).

* cited by examiner

200

300

FEED BLOCK PRODUCTION METHOD USING VACUUM PRESSURE

CROSS REFERENCES

This application is an international application which claims the benefit of U.S. Provisional Application No. 63/377,126, entitled "Vacuum Pressure Lick Tub Process," filed on 26 Sep. 2022, and U.S. Provisional Application No. 63/479,302, entitled "A Method for Making and Dispensing Molasses-Based Animal Feed Supplement under Positive Pressure," filed on 10 Jan. 2023, both of which are incorporated herein by reference in their entirety.

TECHNICAL FIELD

The present disclosure is directed at an improved system and process for manufacture of high energy feed supplements containing temperature-sensitive ingredients as a molasses-based replacement for use in feeding livestock such as cattle, horses, and sheep.

BACKGROUND

Various techniques have been developed for forming supplements and blocks made of compositions suitable for consumption by animals. Animal feed blocks are typically a combination of liquid and dry ingredients mixed and cooked to provide a convenient and efficient way to supplement the feed of animals. Animal feed blocks of the low-moisture type are generally formed in vented cooking vessels. Elevated temperatures may reach 132 degrees Celsius (° C.) (approximately 270 degrees Fahrenheit (° F.)), and above, during cooking. Cooking cycles may last for approximately 60 minutes, or more, at ambient pressures. Often, two or more cooking vessels are required in a single production line. At the end of a cooking cycle, a viscous product having a low moisture percentage may be drawn into a vacuum vessel. The vacuum vessel may cycle for an additional 30 minutes to further decrease the moisture percentage. The viscous product may be discharged to a holding tank to await blending with premix ingredients. An auger or conveyor typically transports the final product into final packaging.

SUMMARY

A low-moisture animal feed composition is formed by an automated process with completion of the following steps: (a) providing a vacuum- and pressure-rated sealable vessel supported by load cells, the sealable vessel may have a cylindrical-shaped upper section and a conical-shaped bottom section; (b) concentrating a liquid ingredient with continuous vacuum application within the sealable vessel; (c) agitating the liquid ingredient with an agitator that is in operational contact with an interior surface of the sealable vessel; (d) applying a vacuum so that an internal pressure within the sealable vessel is between 74.5 kilopascals (kPa) to 98.0 kPa; (e) heating the liquid ingredient with a steam jacket that is in contact with an exterior surface of the sealable vessel; (f) mixing a premix ingredient with the concentrated liquid ingredient within the sealable vessel to form an animal feed composition; (g) releasing the vacuum so that the internal pressure within the sealable vessel equalizes with atmospheric pressure outside the sealable vessel; and (h) applying positive pressure so that the internal pressure within the sealable vessel is greater than atmospheric pressure outside the sealable vessel.

A first heat zone of the steam jacket may be configured to activate and deactivate based on a first fill-level of the liquid ingredient within the sealable vessel. A second heat zone of the steam jacket may be configured to activate and deactivate based on a second fill-level of the liquid ingredient within the sealable vessel. A target weight value of the concentrated liquid ingredient may be calculated based on a target moisture percentage for the concentrated liquid ingredient. The target moisture percentage for the concentrated liquid ingredient may be between approximately 0.5 percent to five percent of total moisture. The concentrating steps of heating, vacuuming, and agitating the liquid ingredient continue until the liquid ingredient undergoes a predetermined reduction in weight. The actual weight of the liquid ingredient may be monitored, via a controller connected to load cells, until the actual weight of the concentrated liquid ingredient corresponds to a target weight value. A target weight signal may be generated when the first load cell indicates the actual weight of the concentrated liquid ingredient equals the target weight value. The controller may end the step of concentrating and maintain a temperature of the concentrated liquid ingredient between 55° C. to 60° C. Alternatively, the controller may initiate a step of heating to aid incorporation of a premix into the concentrated liquid ingredient at a temperature of between 60° C. to 65° C. The temperature of the concentrated liquid ingredient may be increased to 90° C. to facilitate discharge of the viscous mass from the sealable vessel.

A premix may be added into the concentrated liquid ingredient within the sealable vessel upon receipt of a first target weight signal. The first target weight signal may be received upon a first target weight value of the liquid ingredient being met. For example, the first target weight value may be set at 87% of the original weight of the liquid ingredient. The premix may be added into the sealable vessel once the first target weight signal is generated. The liquid ingredient may then be further concentrated until 85% of the original weight of the liquid ingredient remains. The 2% reduction may account for further moisture loss that will occur when premix is incorporated into the liquid ingredient. Once this occurs, a second target weight signal may be received upon the liquid ingredient meeting a second target weight value. A dispensing step may be initiated once the second target weight signal is generated.

The premix may be added to the concentrated liquid ingredient, by weight, based on readings from load cells. The premix may be added to the sealable vessel that unseals and opens when the vacuum is not applied. The vacuum may be reapplied so that the sealable vessel has an internal pressure that is less than the ambient pressure outside the sealable vessel. The addition of the premix may be regulated based on a measured quantity of the concentrated liquid ingredient at the target moisture percentage. A vacuum may be intermittently applied between five seconds to sixty seconds to facilitate mixing of the premix with the concentrated liquid ingredient by allowance of swelling to occur in a controlled environment for purposes of enhancing mixing. The intermittent application of vacuum may continue until the step of mixing is completed. The premix may be introduced into the sealable vessel in a plurality of aliquots dispensed intermittently between vacuum applications.

A dispense outlet may be disposed in the conical-shaped bottom section of the sealable vessel. A product outlet valve may be positioned at the dispense outlet to regulate the amount of the animal feed composition that is dispensed directly into final packaging. A quantified amount of the animal feed composition may be dispensed directly from the sealable vessel into final packaging. The quantified amount may be determined by a reduction in weight based on a reduction in weight of the animal feed composition.

Several notable advantages from use of the automated process and apparatus may include the following: (a) each of the process steps may occur within a single sealable vessel; (b) little to no obnoxious odors from organic volatiles are produced during manufacture of the animal feed composition; (c) volatile vapors emitted are captured and eliminated during manufacture of the animal feed composition; (d) accurate portioning of liquid ingredients by mass; (e) heating and vacuum dehydration of liquid ingredients within a single vessel under constant mass monitoring; (f) precise portioning of added dry ingredients by mass to the concentrated liquid ingredients; (g) blending of liquid ingredients and solid ingredients within the sealable vessel to yield a homogenous mass; (h) accurate dispensing of final product into packages; (i) the sealable vessel mounted on load cells facilitates precise portioning of various liquid components by weight; (j) a heating zone that comprises an electric heating blanket, steam jacket, or oil jacket; (k) a surface-scraping agitator to facilitate even distribution of heat throughout the liquid mass during processing; (l) the sealable vessel is constructed to withstand operation under high vacuum pressures and positive pressures; (m) the sealable vessel is equipped with a bottom discharge that facilitates rapid dispensing of finished product directly into packages; (n) reduced heating under vacuum effectively decreases maximum operating temperatures; (o) a process suitable for ingredients that are heat-sensitive and susceptible to non-enzymatic browning reactions which degrade sugars and nutritive value of finished product; (p) reduction in cooking cycles, thus increasing throughput of finished product, by up to 40% to 60% over conventional systems; and (q) applying positive pressure to the sealable vessel to facilitate dispensing quantifiable amounts of the finished product. Stated advantages may greatly reduce capital expenditure costs for manufacture equipment and make it feasible to remove moisture at substantially lower temperatures, time durations, and energy inputs compared to traditional systems.

The above advantages and features are of representative embodiments only and are presented only to assist in understanding the invention. It should be understood that they are not to be considered limitations on the invention as defined by the claims. Additional features and advantages of embodiments of the invention will become apparent in the following description, from the drawings, and from the claims.

BRIEF DESCRIPTION OF DRAWINGS

Aspects are illustrated by way of example, and not by way of limitation, in the accompanying drawings, wherein.

DETAILED DESCRIPTION

Figure 1:
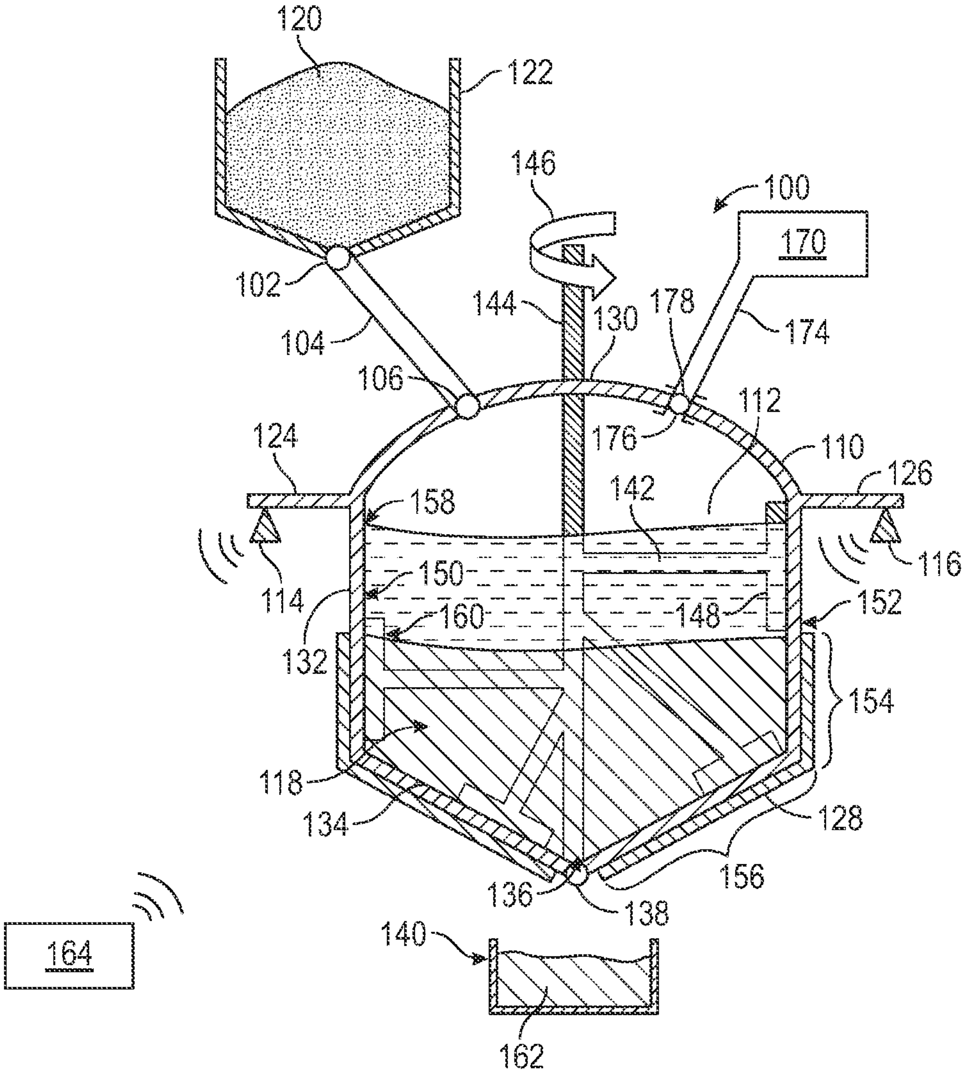
FIG. 1 depicts the concentrating step occurring within an example of a sealable vessel supported by load cells.

An automated system 100 for manufacturing and packaging low-moisture animal feed supplements and feed blocks utilizes a sealable vessel 110. An example of the sealable vessel 110 is shown in FIG. 1. The sealable vessel 110 is supported by load cells. The load cells assist in accurate portioning of liquid ingredients and solid ingredients combined within sealable vessel 110. Liquid and solid ingredients are heated and blended at a lower temperature within the sealable vessel 110. The liquid ingredient may be a mixture of multiple liquids, including aqueous-based and lipid-based liquids. The sealable vessel 110 receives the liquid ingredient and precisely concentrates the liquid ingredient to a target moisture percentage. A prescribed amount of a premix 120 is added into the sealable vessel 110 based on a target weight value read by the load cells. The premix 120 can be mixed with the concentrated liquid ingredient 118. The load cells assist in the accurate discharge of a finished product out of the sealable vessel 110. The finished product may be referred to herein as an animal feed composition 162.

As shown in FIG. 1, a first support member 124 and a second support member 126 are mounted to a cylindrical-shaped upper section 132 of the sealable vessel 110. Each of the support members shown are horizontally aligned and perpendicular to a wall of the cylindrical-shaped upper section 132. Alternatively, the first support member 124 and the second support member 126 may be mounted to a conical-shaped bottom section 134 of the sealable vessel 110. In such configuration, each of the support members may be vertically aligned and parallel with the wall of the cylindrical-shaped upper section 132. Alternatively, the sealable vessel 110 may be supported vertically, from above, by a plurality of hanging support members, such as chains or rods, connected to a convex-shaped top section 130 of the sealable vessel 110.

The sealable vessel 110 may be connected to a scale system, a load cell, or a plurality of load cells. For example, the first support member 124 may be disposed upon and supported by a first load cell 114. The second support member 126 may be disposed upon and supported by a second load cell 116. Each of the load cells may be disposed on a load cell platform (not shown). The load cell platforms may be disposed upon and supported by a framework that provides overall support for the structure.

An advantage to placing the sealable vessel 110 on load cells is the capability to provide accurate portioning of liquid and solid ingredients added into the sealable vessel 110. Another advantage is that reductions in moisture levels may be accurately determined during the concentrating step. Another advantage is that masses of the liquid ingredient 112, concentrated liquid ingredient 118, and animal feed composition 162 may be determined at any point with a high degree of accuracy. The ability to determine mass at each point in the process makes it possible to combine ingredients in precise proportions.

The load cells may be selected from several common types such as electronic, strain gauge, hydraulic, electro-pneumatic, or hydraulic pneumatic. Readings by the load cells may be given in English (or metric) increments of a quarter pound (approx. 0.1 kg), half a pound (approx. 0.25 kg), one pound (approx. 0.5 kg), 2 lbs. (approx. 1 kg), 5 lbs. (approx. 2.5 kg), 10 lbs. (approx. 5 kg), 20 lbs. (approx. 10 kg), 100 lbs. (approx. 50 kg) depending on the quality of adjustment for operation and calibration of the system. Each of the load cells may have a capacity to read up to 2,500 lbs. (approx. 1,134 kg), or more, of weight. In that case, a total capacity of up to 10,000 lbs. (approx. 4,540 kg) of weight may be read by four load cells used in combination.

A single set of load cells may measure the rate of weight change of the sealable vessel 110. The load cells may provide a data input signal to a controller 164. Controller 164 may be a programmable logic controller. Each of the load cells may be electrically connected to the controller 164 or transmit a wireless data input signal to the controller 164 via a transmitter. Alternatively, each of the load cells may be electrically or wirelessly connected to a scale system. The load cells may have network connection with the scale system. The scale system may have high accuracy in order to be legal for trade. The scale system may comprise a beam scale. The controller 164 may be used to calculate the quantity of liquid ingredient 112, concentrated liquid ingredient 118, and animal feed composition 162 within the sealable vessel 110 based on reductions in weight.

The sealable vessel 110 may fully enclose ingredients. Liquid ingredients and solid ingredients may be introduced through the convex-shaped top section 130 of the sealable vessel 110 by way of an opening. The opening may be sealed and unsealed with a lid, hatch, port, or other cover. The sealable vessel 110 is preferably situated below ingredient tanks so that ingredients flow into the sealable vessel 110 under the force of gravity.

Alternatively, the ingredients may be drawn from ingredient tanks by pumping, vacuuming, siphoning, or other transfer means. For example, a liquid ingredient conduit from a liquid ingredient tank may be connected directly to the convex-shaped top section 130 of the sealable vessel 110. Alternatively, the liquid ingredient conduit from the liquid ingredient tank may be connected to any of the sidewalls or bottom walls of the sealable vessel 110. A plurality of valves may be positioned within the liquid ingredient conduit to regulate the flow between the liquid ingredient tank and the sealable vessel 110.

Ingredients incompatible with high-temperature processing may be processed under vacuum pressure within the sealable vessel 110. Cooking under vacuum greatly decreases the amount of heating to avoid threshold temperatures at which ingredients may undergo non-enzymatic browning reactions. Many ingredients incorporated into low-moisture animal feed blocks are typically heated past threshold temperatures. These ingredients may contain reducing sugars and proteins that undergo non-enzymatic browning reactions. Caramelization and Maillard reactions are two types of non-enzymatic browning reactions that may be reduced or eliminated by not exceeding temperature thresholds.

Caramelization is the pyrolytic destruction of carbohydrates that results in formation of brown pigments and volatile compounds. Gases generated from pyrolysis become entrapped within the viscous mass, making it highly porous. Many byproduct liquids streams derived from fruit and vegetable processing contain carbohydrates which are susceptible to pyrolysis.

Maillard reactions are the other class of non-enzymatic browning. Maillard reactions have substantial adverse impacts on nutritional characteristics, animal performance, and (or) animal acceptance of finished products. Five conditions that may induce Maillard reactions are the following: (1) presence of amino compounds, such as protein, peptides, or amino acids; (2) presence of reducing sugars; (3) heat; (4) moisture; (5) time. Maillard reactions require heat to get started, but when the reaction becomes exothermic, the heat generated accelerates the process. Amino compounds in proteins, peptides, and amino acids react with reducing sugars such as glucose, fructose, xylose, lactose, galactose, maltose, etc. Different sugars degrade at different temperatures, with fructose being among the most sensitive. Ultimately heat, volatile compounds, and carbon dioxide are released.

Over-heating may lead to formation of gases that become entrapped within the viscous mass of the final product. Final products may swell thus increasing volume which exceed that of its container. Finished products can be characterized by a “muffin” or “mushroom” effect. In conventional manufacturing processes, the finished product is cooled before packaging to avoid such effects. Final products processed under vacuum pressure within the sealable vessel 110 during operation of the automated system 100 forgo these effects.

The liquid ingredient 112 may be a molasses ingredient, an edible oil ingredient such as vegetable oil, whey from milk processing, or a grain-based ingredient, any of which may be heat-sensitive or have a high-moisture content. The liquid ingredient 112 may be a liquid mixture of the molasses ingredient, edible oil ingredient, whey ingredient, ingredients derived from food or vegetable processing, wood extractives such as maple sap, algae biomass, grain-based ingredients, or any combination thereof.

The liquid ingredient 112 may be a molasses ingredient processed within sealable vessel 110 during operation of the automated system 100. The molasses ingredient may be a product, co-product, or byproduct of plant, fruit, vegetable, or wood processing. The molasses ingredient may be a cane molasses, beet molasses, starch molasses, citrus molasses, soybean molasses, or a combination thereof. The molasses ingredient may be heat-sensitive. Molasses ingredients may be used independently from, or mixed in combination with, other ingredients and additives to form the animal feed composition 162. The molasses ingredient may be a primary component of the animal feed composition 162. Alternatively, the molasses ingredient may be a secondary component of the animal feed composition 162.

The liquid ingredient 112 may be a grain-based ingredient processed within sealable vessel 110 during operation of the automated system 100. Grain-based ingredients that are liquid, are referred to herein as grain-based liquid ingredients. The grain-based liquid ingredient may be a product, co-product, or byproduct of grain processing. The grain-based liquid ingredient may be heat-sensitive, have a high-moisture content, and (or) high-protein value. Grain-based liquid ingredients may include condensed fermented corn extractives (CFCE, or “corn steep liquor”), condensed distiller’s solubles (CDS, or “syrup” or “solubles”), wet distiller’s grains (WDG, or “wet cake”), wet distiller’s grains with solubles (WDGS), distiller’s syrups, corn syrup, soybean derivatives, crude corn oil, distiller’s corn oil, or pot ale syrup. Grain-based liquid ingredients may be used independently from, or mixed in combination with, other ingredients and additives to form the animal feed composition 162. The grain-based liquid ingredient may be the primary component of animal feed composition 162.

Solid ingredients that are incompatible with high temperatures may be processed within the sealable vessel 110 during operation of this automated system 100. A solid ingredient may be a product, co-product, or byproduct of plant, fruit, vegetable, or grain processing, or a combination thereof. The solid ingredient may be heat-sensitive. Solid ingredients may include byproducts from fruit processing including apple pomace, grape pomace, olive pomace, tomato pomace, or byproducts from plants. The solid ingredient may be mixed in combination with liquid ingredients and additives to form the animal feed composition 162. The solid ingredient may be the secondary component of the animal feed composition 162.

The solid ingredient may be a grain-based ingredient processed within sealable vessel 110 during operation of the automated system 100. Grain-based ingredients that are solid, are referred to herein as grain-based solid ingredients. The grain-based solid ingredient may be a product, co-product, or byproduct of grain processing. The grain-based solid ingredient may have a high-fiber content or high-protein value. Grain-based solid ingredients may include distiller's grains, dried distiller's grains with solubles (DDGS), solid byproducts of corn wet milling, corn starch, corn gluten feed (CGF), corn gluten meal (CGM), corn germ meal, wheat middlings, brewers solubles, byproducts of soybean plants, soy solubles, or soybean meal. Grain-based solid ingredients may be mixed in combination with liquid ingredients and additives to form the animal feed composition 162. The grain-based solid ingredient may be the secondary component of animal feed composition 162.

Initial moisture content of the liquid ingredient 112 before the concentrating step may be substantially higher than final moisture content of the concentrated liquid ingredient 118 after the concentrating step is completed. For example, the liquid ingredient 112 may have an initial moisture content greater than 30% of the total weight of the liquid ingredient 112. The liquid ingredient 112 that is unconcentrated may have an initial moisture content range of between approximately 25% to 75% of the total weight of the liquid ingredient 112. The liquid ingredient 112 that is unconcentrated may have an initial moisture content range further between 40% to 65%, between 40% to 60%, between 50% to 65%, between 55% to 65%, between 60% to 75%, or between 50% to 65%, or any value or range between.

Table 1, which follows, sets forth potential liquid ingredients and initial moisture content ranges for liquid ingredients, some of which have a high-moisture content (i.e., greater than 40% moisture content) before concentration:

TABLE 1

| Liquid Ingredient | Initial Moisture Content Range (approx.) |
|---|---|
| Cane molasses | 15%-40% |
| Beet molasses | 15%-35% |
| Citrus molasses | 15%-50% |
| Soybean molasses | 30%-60% |
| Corn steep liquor | 45%-65% |
| Condensed distiller's solubles | 55%-75% |
| Whey | 40%-95% |
| Concentrated separator byproduct | 25%-50% |
| Sulfite liquor | 30%-60% |
| Liquid yeast | 45%-95% |
| Algae biomass | 30%-95% |
| Distiller's grains | 45%-70% |
| Animal fat | 0%-20% |
| Vegetable oil | 0%-20% |

Configuration of the sealable vessel 110 may assist in concentrating the liquid ingredient 112. A lower section of the cylindrical-shaped upper section 132 and the conical-shaped bottom section 134 may be fitted with a steam jacket 128. The steam jacket 128 may be disposed adjacent to an exterior surface 152 of the sealable vessel 110. The steam jacket 128 may be in contact with the exterior surface 152 of the sealable vessel 110. Heat applied through the steam jacket 128 may diffuse directly through the walls of sealable vessel 110 to concentrate the liquid ingredient 112 therein. The steam jacket 128 may be heated to a temperature of between 50° C. to 200° C. and a steam pressure between 10 kPa to 550 kPa.

The ingredient fill-level may decrease as the liquid ingredient 112 reduces in volume during the concentrating step. The ingredient fill-level may increase during an ingredient filling step, such as when the premix 120 is added, or as vacuum pressure is applied. Heat flow to an upper heating zone of the steam jacket 128 may be activated based on an increase in an ingredient fill-level to a first-fill level 158. Heat flow to the upper heating zone may be deactivated based on a decrease of the liquid ingredient fill-level to a second fill-level 160. A lower heating zone of the steam jacket 128 may remain activated to maintain the temperature of the concentrated liquid ingredient 118. Activating and deactivating heating zones further reduces capital costs due to the conservation of energy.

As shown in FIG. 1, the steam jacket 128 has a plurality of heating zones. A first heat zone may be located at an upper portion of the cylindrical-shaped upper section 132. A second heat zone 156 may be located at a lower portion of the conical-shaped bottom section 134. Each of the heat zones may be independently activated and deactivated by the controller 164 based on the ingredient fill-level. Controller 164 may regulate the steam jacket 128 based on moisture content and temperature sensor readings taken within the internal open space of the sealable vessel 110.

The sealable vessel 110 may be operated with an internal pressure under vacuum to concentrate the liquid ingredient 112 while heated and agitated. The automated system 100 employs vacuum to process the liquid ingredient 112 at lower temperatures so that the risk of damage to the liquid ingredient 112 from non-enzymatic browning reactions is reduced. Vacuum processing within the sealable vessel 110 reduces vapor pressure, so water vapor can be formed at reduced temperature and then be removed. Vacuum processing concentrates the liquid ingredient 112 within the sealable vessel 110 at lower heat, thereby decreasing energy consumption costs. Additionally, the liquid ingredient 112 processed at lower operating temperatures is less likely to degrade organic materials and emit organic volatiles that may not be aromatically pleasing to bystanders and operators.

The sealable vessel 110 may be rated based on a specified internal pressure range. Internal pressure during the concentrating step may be between 74.5 kilopascals (kPa) to 98.0 kPa. The sealable vessel 110 may operate at other internal pressures during the concentrating step such as between 74.5 kPa to 84.5 kPa, between 88.0 kPa to 98.0 kPa, between 84.5 kPa to 88.0 kPa, between 74.5 kPa to 93.5 kPa, between 93.5 kPa to 98.0 kPa, between 90 kPa to 95 kPa, between 74.5 kPa to 79.5 kPa, or between 88.0 kPa to 93.5 kPa.

Vacuum may be applied to an internal space of the sealable vessel 110 continuously during the concentrating step. The concentrating step may be less than 20 minutes. The concentrating step may occur over an interval of time lasting between 10 minutes and 30 minutes, between 15 minutes to 25 minutes, or between 10 minutes to 20 minutes. A noted advantage in utilizing this automated system 100 is a reduction in feed production processing times by as much as 25% to 75% over other systems available.

Applications of heat and vacuum within sealable vessel 110 reduces moisture content of the liquid ingredient 112. Alternatively, moisture content of the liquid ingredient 112 may be pre-reduced outside the sealable vessel 110 by reverse osmosis, filtration, a diffusion membrane, or a combination thereof, prior to heating within sealable vessel 110. The moisture percentage of the liquid ingredient 112 processed during the concentrating step may be reduced between 10% to 90% to form a concentrated liquid ingredient 118. A target moisture percentage for the total moisture content of the concentrated liquid ingredient at the end of the concentrating step may be between approximately 0.5% to 5%. The target moisture percentage may be further between 0.5% to 3%, between 1% to 3%, between 2% to 4%, between 3% to 5%, between 0.5% to 2.5%, or between 0.5% to 1.5%.

In one example, a molasses and oil mixture having an initial moisture percentage of between 15% to 25% may be introduced into the sealable vessel 110 up to the first fill-level 158. The molasses and oil mixture may then be concentrated to the second fill-level 160. The initial moisture percentage of the molasses and oil mixture may be reduced between 14.5% to 24.5% to a final moisture percentage of around 0.5%. In another example, a corn steep liquor and oil mixture having an initial moisture percentage of between 45% to 55% may be introduced into the sealable vessel 110 up to a first fill-level 158. The corn steep liquor and oil mixture may then be concentrated to the second fill-level 160. The initial moisture percentage of the corn steep and oil mixture may have been reduced between 44.5% to 54.5% to a final moisture percentage of around 0.5%. In another example, a condensed distiller's solubles and oil mixture having an initial moisture percentage of between 60% to 70% may be introduced into the sealable vessel 110 up to the first fill-level 158. The condensed distiller's solubles and oil mixture may then be concentrated to the second fill-level 160. The initial moisture percentage of the condensed distiller's solubles and oil mixture may have been reduced between 59.5% to 69.5% to a final moisture percentage of around 0.5%.

Evaporated water and volatile vapors released from the liquid ingredient 112 may be removed and captured with a heat exchanger positioned outside the sealable vessel 110. The heat exchanger may condense the evaporated water and volatile vapors for collection and disposal.

Applications of heat and vacuum within sealable vessel 110 also reduces the weight of the liquid ingredient 112. The liquid ingredient 112 may undergo a predetermined reduction in weight as the step of concentrating the liquid ingredient 112 occurs. The predetermined reduction in weight of the liquid ingredient 112 may be based on a theoretical target weight. The predetermined reduction in weight of the liquid ingredient 112 can be expressed as a percentage value of the difference between the unconcentrated weight of the liquid ingredient 112 and the theoretical target weight of the concentrated liquid ingredient 118. The predetermined reduction in weight of the liquid ingredient 112 may be between 15% to 85%, between 20% to 65%, between 20% to 50%, or further between 20% to 40%.

In one example, a molasses and oil mixture having an unconcentrated weight of 25.6 kg (approx. 56.4 lbs.) was introduced into sealable vessel 110. The theoretical weight of the liquid ingredient 112 may be predetermined based on an assumption that moisture-containing component of the molasses can be dehydrated to a final moisture percentage of 0.5%. In the example given, the theoretical target weight calculated for the molasses and oil mixture after heating was 20.6 kg (approx. 45.6 lbs.). The molasses and oil mixture reduced to an actual weight of 20.1 kg (approx. 44.4 lbs.) within the sealable vessel 110. The actual weight of the concentrated liquid ingredient 118 obtained from weight readings of the sealable vessel 110 may be utilized to adjust calculations for determining the theoretical target weight for subsequent feed production runs.

Vacuuming and heating the liquid ingredient 112 may reduce viscosity between 1,000 centipoises (cps) to 10,000,000 cps. It should be noted that 1,000 cps equals 1 pascal-second. By end of the concentrating step, the concentrated liquid ingredient 118 may have a viscosity of between 5,000 cps to 2,000,000 cps, between 1,000 cps to 5,000 cps, between 5,000 cps to 10,000 cps, between 10,000 cps to 1,000,000 cps, between 10,000 cps to 25,000 cps, between 25,000 cps to 250,000 cps, or between 150,000 cps to 2,000,000 cps.

The sealable vessel 110 operated under lower operating temperatures may prevent ingredients that are heat sensitive from reaching threshold temperatures. During the step of concentrating, maintenance of the temperature of the liquid ingredient 112 and (or) the concentrated liquid ingredient 118 at or below 57° C. (approximately 135° F.) may reduce occurrences of non-enzymatic browning. During the concentrating step, temperature ranges of the liquid ingredient 112 and (or) the concentrated liquid ingredient 118 may be maintained between 50° C. to 75° C., between 56° C. to 58° C., between 50° C. to 60° C., between 55° C. to 65° C., between 55° C. to 60° C., between 65° C. to 75° C., or between 55° C. to 75° C. Temperature of the concentrated liquid ingredient 118 within the sealable vessel 110 by the end of the concentrating step may be between 55° C. to 60° C.

Compositions processed within the sealable vessel 110 may be made of a liquid ingredient 112 that is predominantly molasses-based, substantially free of molasses, or without molasses. The primary component of the final product may be the concentrated liquid ingredient 118. The concentrated liquid ingredient 118 may account for between 40% to 95% by weight of the final product. The concentrated liquid ingredient 118 may be further between 40% to 55% by weight, between 50% to 65% by weight, between 55% to 70% by weight, between 70% to 95% by weight, or up to 100% by weight of the final product. Compositions processed within the sealable vessel 110 may be dehydrated and hardened by addition of a premix 120 to the liquid ingredient that is concentrated, partially concentrated, or not concentrated. The secondary component of the final product may be the premix 120. The premix 120 may account for between 5% to 40% by weight of the final product. The premix 120 may be further between 5% to 20% by weight, between 10% to 25% by weight, between 15% to 25% by weight, between 25% to 40% by weight, between 15% to 30% by weight, or up to 40% by weight of the final product.

Table 2, which follows, sets forth recipes and test results from processing the example recipes within the sealable vessel 110 during operation of the automated system 100:

TABLE 2

| | Recipe Formula number | | | | | | | | | |
|---|---|---|---|---|---|---|---|---|---|---|
| Ingredient | #1 | #1b | #2 | #2b | #3 | #3b | #4 | #4b | #5 | #5b |
| Liquid mix before heating(kg) | | | | | | | | | | |
| Cane molasses | 24.5 | 24.5 | 24.5 | 24.5 | 25.2 | 25.2 | 25.2 | 25.2 | — | — |
| Corn steep liquor | — | — | — | — | — | — | — | — | 34.3 | 34.3 |

TABLE 2-continued

| | | | | | | | | | | |
|---|---|---|---|---|---|---|---|---|---|---|
| Condensed distiller's solubles | — | — | — | — | — | — | — | — | — | — |
| Vegetable oil | 1.1 | 1.1 | 1.1 | 1.1 | 1.1 | 1.1 | 1.1 | 1.1 | 0.9 | 0.9 |
| TOTAL | 25.6 | 25.6 | 25.6 | 25.6 | 26.3 | 26.3 | 26.3 | 26.3 | 35.2 | 35.2 |
| Dry matter of liquid mix (%) | 62.0 | 62.0 | 62.0 | 62.0 | 63.6 | 63.6 | 63.6 | 63.6 | 41.6 | 41.6 |
| Theoretical after heating [a] (kg) | 20.7 | 20.7 | 20.7 | 20.7 | 21.2 | 21.2 | 21.2 | 21.2 | 17.9 | 17.9 |
| Peak process temperature [b] (C. °) | 135 | 136 | 56 | 57 | 136 | 136 | 57 | 57 | 58 | 58 |
| Peak process vacuum [c] (kPa) | 0 | 0 | 86.7 | 87.0 | 0 | 0 | 88.4 | 88.4 | 88.7 | 88.7 |
| Total processing time [d] (min.) | 38 | 41 | 17 | 18 | 41 | 40 | 18 | 18 | 37 | 39 |
| Liquid mix after heating (kg) | 20.1 | 20.0 | 20.9 | 20.4 | 20.5 | 20.6 | 21.0 | 21.3 | 21.2 | 21.3 |
| Recovery of heated mix [e] (%) | 78.7 | 78.2 | 81.7 | 79.8 | 78.2 | 78.4 | 79.8 | 81.0 | 51.9 | 51.7 |
| Yield as percent of theoretical [f] | 97.4 | 96.7 | 101.1 | 98.7 | 96.8 | 97.0 | 98.7 | 97.0 | 102.0 | 101.5 |
| Premix ingredients (kg) | | | | | | | | | | |
| Dehulled soybean meal | — | — | — | — | 3.16 | 3.17 | 3.23 | 3.27 | 2.31 | 2.30 |
| Corn gluten meal | — | — | — | — | — | — | — | — | — | — |
| Urea | — | — | — | — | 0.92 | 0.93 | 0.94 | 0.95 | 0.81 | 0.81 |
| Ground limestone | 2.12 | 2.10 | 2.2 | 2.15 | 0.39 | 0.39 | 0.4 | 0.41 | 0.93 | 0.92 |
| Monocalcium phosphate | 3.71 | 3.68 | 3.85 | 3.76 | 1.05 | 1.06 | 1.08 | 1.09 | 0.58 | 0.56 |
| Vitamin premix | 0.26 | 0.26 | 0.28 | 0.28 | 0.13 | 0.13 | 0.14 | 0.14 | 0.18 | 0.11 |
| Trace mineral premix | 0.26 | 0.26 | 0.28 | 0.27 | 0.13 | 0.13 | 0.14 | 0.14 | 0.18 | 0.11 |
| Final batch weight (kg) | 26.5 | 26.3 | 27.5 | 26.9 | 26.3 | 26.4 | 26.9 | 27.3 | 23.1 | 23.0 |

| | Recipe Formula number | | | | | | | | | |
|---|---|---|---|---|---|---|---|---|---|---|
| Ingredient | #6 | #6b | #7 | #7b | #8 | #8b | #9 | #9b | #10 | #10b |
| Liquid mix before heating (kg) | | | | | | | | | | |
| Cane molasses | — | — | 8.53 | 8.53 | — | — | 6.8 | 6.8 | 6.8 | 6.8 |
| Corn steep liquor | 42.4 | 42.4 | — | — | — | — | 24.1 | 24.1 | 20.2 | 20.2 |
| Condensed distiller's solubles | — | — | 32.4 | 32.4 | 52.2 | 52.2 | — | — | — | — |
| Vegetable oil | 0.91 | 0.91 | 0.68 | 0.68 | 0.54 | 0.54 | 1.09 | 1.09 | 1.09 | 1.09 |
| TOTAL | 43.3 | 43.3 | 46.2 | 46.2 | 52.7 | 52.7 | 32 | 32 | 28.1 | 28.1 |
| Dry matter of liquid mix (%) | 50.4 | 50.4 | 42.7 | 42.7 | 34.2 | 34.2 | 42.1 | 42.1 | 38.6 | 38.6 |
| Theoretical after heating [a] (kg) | 21.9 | 21.9 | 18.1 | 18.1 | 17.6 | 17.6 | 18.5 | 18.5 | 16.6 | 16.6 |
| Peak process temperature [b] (C. °) | 58 | 58 | 58 | 58 | 58 | 58 | 58 | 58 | 58 | 58 |
| Peak process vacuum [c] (kPa) | 88.7 | 88.7 | 88.7 | 88.7 | 91.4 | 91.4 | 91.4 | 91.4 | 91.4 | 91.4 |
| Total processing time [d] (min.) | 41 | 41 | 38 | 37 | 44 | 43 | 33 | 34 | 31 | 32 |
| Liquid mix after heating (kg) | 21.7 | 21.9 | 18.7 | 18.3 | 18.0 | 17.5 | 18.6 | 18.1 | 16.8 | 16.5 |
| Recovery of heated mix [e] (%) | 50.2 | 50.7 | 44.9 | 43.9 | 34.1 | 33.2 | 58.3 | 56.6 | 59.6 | 58.7 |
| Yield as percent of theoretical [f] | 99.2 | 100 | 103 | 101 | 102 | 99.5 | 101 | 97.9 | 101 | 99.6 |
| Premix ingredients (kg) | | | | | | | | | | |
| Dehulled soybean meal | — | — | 2.35 | 2.29 | — | — | — | — | — | — |
| Corn gluten meal | — | — | — | — | — | — | 6.86 | 6.66 | 6.89 | 6.78 |
| Urea | — | — | 0.82 | 0.80 | — | — | — | — | 1.93 | 1.90 |
| Ground limestone | 0.54 | 0.54 | 0.94 | 0.92 | 0.37 | 0.36 | 0.91 | 0.88 | 0.91 | 0.89 |
| Monocalcium phosphate | — | — | 0.41 | 0.40 | — | — | 0.77 | 0.75 | 0.77 | 0.76 |
| Vitamin premix | 0.11 | 0.11 | 0.12 | 0.11 | 0.09 | 0.09 | 0.14 | 0.13 | 0.14 | 0.14 |
| Trace mineral premix | 0.11 | 0.11 | 0.12 | 0.11 | 0.09 | 0.09 | 0.14 | 0.13 | 0.14 | 0.14 |
| Final batch weight (kg) | 22.5 | 22.7 | 23.4 | 22.9 | 18.5 | 18 | 27.5 | 26.6 | 27.6 | 27.1 |

[a] Yield of dried mixture from liquid ingredients, based on the assumption that moisture-containing components (molasses, corn steep liquor, and distiller's solubles) are dehydrated to final moisture content of 0.5%.

[b] Temperature at which heating/evaporation process was terminated.

[c] Vacuum was applied during the heating process to accelerate evaporation, and peak vacuum represents the vacuum pressure recorded upon termination of the heating phase.

[d] Time required to achieve peak temperature/vacuum during the heating/evaporation phase.

[e] Weight of liquid ingredients after heating, expressed as a percent of initial weight.

[f] Actual yield of heated mixture expressed as a proportion of theoretical yield X 100.

In Table 2, one should note that higher percent yield recoveries, on average, were associated with recipes processed under higher vacuum pressures and lower temperatures. Higher recoveries may be due to an overall decrease in non-enzymatic browning reactions, caramelization reactions, or other reactions that cause destruction or volatilization of organic compounds. Lower percent yield recoveries, on average, were associated with recipes processed under higher temperatures with little to no vacuum pressure applied. Lower recoveries may be due to an overall increase in non-enzymatic browning reactions. Degradation of ingredients into organic volatiles and unwanted byproducts may be attributed to those cooking processes that caused an overall increase in non-enzymatic browning reactions.

After the concentrating step, temperatures of the concentrated liquid ingredient 118 may be maintained between 50° C. to 75° C. Temperatures of the concentrated liquid ingredient 118 may be maintained further between 56° C. to 58° C., between 50° C. to 60° C., between 55° C. to 65° C., between 55° C. to 60° C., between 60° C. to 65° C., between 65° C. to 75° C., or between 55° C. to 75° C. to facilitate incorporation of the premix 120 with the concentrated liquid ingredient 118.

The temperature may be regulated based on the ingredients utilized for formation of the animal feed composition 162, such as taking into consideration the use of heat-sensitive additives. Heat-sensitive additives may be included with the premix 120 since the automated system 100 operates at lower temperatures. Heat-sensitive additives may be selected from probiotics, minerals, vitamins, proteins, amino acids, fats, carbohydrates, reducing sugars, and a combination thereof.

The premix 120 may be made of dry and granular ingredients, such as sieved, powdered, pelleted, or diced solid feed ingredients. The premix 120 may include liquids, pastes, gels, or semi-solid feed ingredients independently from, or in combination with, the dry and granular ingredients. Addition of the premix 120 may decrease moisture content of the concentrated liquid ingredient 118. For example, a premix 120 may contain a moisture content of less than 20% by weight of the premix 120. Moisture content in the premix 120 may be present in amounts of 20% or less by weight of the premix 120, including 10% or less by weight, 5% or less by weight, 4% or less by weight, 3% or less by weight, 2% or less by weight, 1% or less by weight, 0.5% or less by weight, down to 0% by weight of the premix 120, or any value or range between any two of these values.

Accurate regulation of the premix 120, including additives, into the sealable vessel 110 may be based on a weight of the concentrated liquid ingredient 118 as indicated by readings from the scale system. The amount of total moisture removed from the liquid ingredient 112 can be calculated by the loss-in-weight between the initial weight of the liquid ingredient and the final weight of the concentrated liquid ingredient 118. Connecting the sealable vessel 110 to a scale system gives the controller 164 indication when the liquid ingredient 112 is concentrated to a target weight value. The addition of a prescribed amount of the premix 120 may be regulated by the controller 164 in coordination with readings from the scale system. Alternatively, the entire quantity of the premix 120 may be dispensed into the sealable vessel 110 at one time.

Controller 164 may adjust durations of the concentrating or mixing steps based on moisture content and temperature sensor readings measured from the composition within sealable vessel 110. Additionally, since the post-evaporative weight may be a known quantity, it is possible to add precise quantities of premix 120 to achieve a predetermined recipe formulation for the animal feed composition 162. First, a pre-evaporative weight may be determined when the liquid ingredient 112 is added. Second, the sealable vessel 110 mounted on the scale system may be tarred to zero. Then the difference in weights read by the load cells when the liquid ingredient 112 is concentrated gives the difference in weight change so the post-evaporate weight is known. Controller 164 will stop the step of concentrating when the post-evaporative weight matches the target weight value of the concentrated liquid ingredient 118 based on the target moisture percentage.

Controller 164 may use inputs from the weight readings of the sealable vessel 110 to determine the prescribed amount of the premix 120 to be added. Therefore, proportions do not have to be estimated, which often results in finished products that are poorly homogenized and outside specifications. Precise measurements by the system lead to finished product compositions that may better comply with nutritional labeling.

Controller 164 may send a signal to open a premix outlet valve, which may be automated, to dispense a prescribed amount of premix 120 into the concentrated liquid ingredient 118 within the sealable vessel 110. Controller 164 may also monitor and control the flow of premix 120 from the premix bin 122 by regulating the premix outlet valve. As such, the sealable vessel 110 is preferably situated below the premix bin 122 so that the premix 120 dispenses into the sealable vessel 110 under the force of gravity.

As shown in FIG. 1, a premix conduit 104 may be connected between the premix bin 122 and the sealable vessel 110. The premix conduit 104 may be connected directly with the convex-shaped top section 130 of the sealable vessel 110. A first premix valve 102 is positioned at a bottom portion of the premix bin 122 at a first end of the premix conduit 104. A second premix valve 106 may be positioned at the convex-shaped top section 130 of the sealable vessel 110 at the second end of the premix conduit 104. The controller 164 may selectively operate opening and closing of the first premix valve 102 and the second premix valve 106.

Preferably, following the concentration step, vacuum is released and premix 120 is added to the sealable vessel 110 that is unsealed. Alternatively, the sealable vessel 110 may remain sealed, and the premix 120 drawn into the sealable vessel 110 as the vacuum is maintained. The vacuum may be repeatedly applied and released with continuous agitation during incorporation of the premix 120. Such vacuum blending facilitates improved homogeneity of final product mixtures. When the sealable vessel 110 is unsealed, the concentrated liquid ingredient 118 may expand and rise with the introduction of atmospheric pressure. Such expansion may allow incorporation of greater amounts of premix 120 into the concentrated liquid ingredient 118 when introduced. Alternating between periods of resealing the sealable vessel 110 to reapply the vacuum and unsealing the sealable vessel 110 to add aliquots of the premix 120 may provide greater homogeneity throughout the mixture. During the mixing step, which may occur continuously for between one minute to ten minutes, the premix 120 mixes with the concentrated liquid ingredient 118 to achieve the predetermined recipe formulation of the animal feed composition 162 within the sealable vessel 110.

During this period of mixing, the vacuum may be repeatedly applied and released between five seconds to 60 seconds intervals at a time. During intermittent applications of vacuum, the vacuum may be applied for an interval of time lasting between five seconds to 55 seconds. The interval of time the intermittent vacuum is applied may be further between seconds to 45 seconds, further between 5 seconds to 15 seconds, further between 10 seconds to 40 seconds, further between 15 seconds to 30 seconds, further between 30 seconds to 45 seconds, further between 20 seconds to 40 seconds, or further between 45 seconds to 60 seconds.

In one example, during a mixing step having a three-minute duration, the vacuum was repeatedly cycled on at each half minute so that the internal pressure within the sealable vessel was between 90 kilopascals to 95.0 kilopascals for approximately 10 seconds then shut off. Depending on the viscosity, the concentrated liquid ingredient 118 may be heated up to between 60° C. to 65° C. (approx. 140° F. to 150° F.) to facilitate mixing. In one example, 1,500 gallons of mixture took between one minute to five minutes to fully mix. In some cases, the temperature of the animal feed composition 162 may be increased to 60° C., 65° C., or 75° C. (approx. 140° F., 150° F., or 170° F., respectively) to decrease the viscosity in order to incorporate the premix 120 or discharge the animal feed composition 162.

The premix 120 mixes with the concentrated liquid ingredient 118 by mechanical action from the agitator 142 within the sealable vessel 110. The agitator 142 is preferably positioned in operational contact with interior wall surfaces of sealable vessel 110. The agitator 142 may engage an interior surface 150 of the cylindrical-shaped upper section and the conical-shaped bottom section 134, simultaneously, to increase mixing and incorporation of the premix 120 into the concentrated liquid ingredient 118.

As shown in FIG. 1, the agitator 142 may comprise a shaft 144 that rotates (shown by movement arrow 146) about a central axis vertically disposed through the sealable vessel 110. Shaft 144 may be rotated clockwise or counterclockwise. The central axis may be positioned longitudinally through a central portion of the convex-shaped top section 130 and a dispense outlet 136 of the conical-shaped bottom section 134 of the sealable vessel 110. The shaft 144 of the agitator 142 may be attached to one or more agitating arms.

The agitator 142 may comprise a plurality of scrapers 148. The plurality of scrapers 148 may be connected to distal ends of the agitating arms attached to the shaft 144. As shown in FIG. 1, four sets of scrapers are attached to the shaft 144 by the agitating arms, where two sets of scrapers are in contact with the interior surface 150 at the cylindrical-shaped upper section 132 and two sets of scrapers are in contact with the interior surface 150 at the conical-shaped bottom section 134. The plurality of scrapers 148 may be biased towards the interior surface 150 of the sealable vessel 110 by use of a spring system. Each of the scrapers may be made from nylon or other durable material. Any number of scrapers may be utilized depending on the size of the scrapers utilized and the size of the interior surface 150 of the sealable vessel 110.

The plurality of scrapers 148 may contact the interior surface 150 of the sealable vessel 110 to scrape away ingredients of the animal feed composition. Scraping prevents scorching of the ingredients of the animal feed composition. Scraping the heat exchange surface accelerates heating of the ingredients of the animal feed composition since the interior surface 150 of the sealable vessel 110 is scraped free of accumulated residues that may impede or hinder heat transfer. Scraping ingredients of the animal feed composition away from the interior surface 150 maintains uniform mixing of the ingredients to form the animal feed composition 162. In addition, the plurality of scrapers 148 may be shaped and (or) angled to force the animal feed composition 162 down towards the dispense outlet 136 of the sealable vessel 110.

The temperature of the animal feed composition 162 within the sealable vessel 110 before the dispensing step may be between 50° C. to 75° C. In anticipation of the dispensing step, temperature may be raised to 90° C. to facilitate discharge of the animal feed composition 162. After the concentrating and blending steps are completed, temperatures of the animal feed composition 162 may be raised between 60° C. to 90° C., between 65° C. to 75° C., between 75° C. to 90° C., between 70° C. to 80° C., or between 75° C. to 85° C. After the step of dispensing, maintaining the temperature of the animal feed composition 162 at or below 57° C. (approximately 135° F.) may reduce the chance of Maillard reactions from occurring.

After homogeneous blending, a dispense outlet 136 is opened to allow the animal feed composition 162 to flow out of the sealable vessel 110, under the force of gravity, into final packaging 140. The dispense outlet 136 may be operated automatically in response to signals generated by controller 164. The conical-shaped bottom section 134 of the sealable vessel 110 may serve as a funnel to direct discharge of the animal feed composition 162.

The slope of the conical-shaped bottom section 134 may be angled towards the dispense outlet 136 from horizontal to less than 45°, further between 20° to 40°, further between 15° to 35°, further between 15° to 25°, or further between 15° to 20°.

A product outlet valve 138, which may be automated, may be positioned at the dispense outlet 136 to control the discharge of the animal feed composition 162. The product outlet valve 138 may be a slide gate made operable for opening and closing by command of the controller 164. The final package may be a common type of feed block packaging. As shown in FIG. 1, animal feed composition 162 may be allowed to cool and harden into block shapes within the final packaging 140.

Discharge of the animal feed composition 162 may be accelerated by introducing positive pressure within the sealable vessel 110. Positive pressure is applied to the animal feed composition 162 within the internal space of the sealable vessel 110 during the dispensing step. Positive pressure may be applied by pneumatic, hydraulic, or mechanical means, or a combination thereof. In one example, a pressure device may be manually controlled to facilitate discharge of the animal feed composition 162 from the sealable vessel 110. In a preferred example, the pressure device may be a pneumatic pump 170 that can also serve as an air compressor or vacuum pump.

As shown in FIG. 1, pneumatic pump 170 may be operated to extract air or other gas from the sealable vessel 110 through port 176 disposed in the wall of the sealable vessel 110. Pneumatic pump 170 is connected to the sealable vessel via a gas conduit 174. The pneumatic pump 170 may create a vacuum within the sealable vessel 110 during the concentrating step and during blending of the premix. In addition, the pneumatic pump 170 may introduce compressed air into the sealable vessel 110 during the dispensing step. In the case of operating the automated system 100 under pneumatic pressure, port 176 disposed through the wall of the sealable vessel 110 introduces air or other gas into the sealable vessel 110. A first pneumatic valve 178 may be positioned within port 176 or gas conduit 174. The first pneumatic valve 178 may open and regulate the amount of vacuum or positive pressure induced upon the internal space within sealable vessel 110. The pneumatic pump 170 may supply positive pressure to increase the internal pressure of the sealable vessel 110 thus forcing the animal feed composition 162 through the dispense outlet 136. Positive pressure may be applied so that the sealable vessel 110 has an internal pressure greater than ambient pressure.

Positive pressure may be continuously applied during the dispensing step. The positive pressure may be regulated to adjust the speed at which the animal feed composition is discharged into final packaging 140 during the dispensing step. The pneumatic pump 170 may supply positive pressure at between one pound per square inch (psi) to 10 psi (approx. 7 kPa to 70 kPa) over the internal pressure of the sealable vessel 110 at ambient pressure. Positive pressure applied by the pneumatic pump 170 during the dispensing step may be further between one psi to 5 psi (approx. 7 kPa to 34 kPa), between 2 psi to 5 psi (approx. kPa to 34 kPa), between 4 psi to 7 psi (approx. 28 kPa to 48 kPa), between 2 psi to 8 psi (approx. 14 kPa to 55 kPa), between one psi to 2 psi (approx. 7 kPa to 14 kPa), or between 3 psi to 5 psi (approx. 21 kPa to 34 kPa).

Internal pressure within the sealable vessel 110 during the dispensing step may be between 80.0 kPa to 170.0 kPa. Internal pressure within the sealable vessel 110 during the dispensing step may be further between 90.0 kPa to 100.0 kPa, 94.5 kPa to 104.5 kPa, between 98.0 kPa to 108.0 kPa, between 101.5 kPa to 106.5 kPa, between 98.0 kPa to 103.0 kPa, between 98.0 kPa to 101.0 kPa, between 100 kPa to 105 kPa, between 117 kPa to 122.0 kPa, between 113.0 kPa to 118.0 kPa, between 122.0 kPa to 136.0 kPa, between 80.0 kPa to 150.0 kPa, between 100 kPa to 120 kPa, between 101.5 kPa to 130 kPa, between 98 kPa to 122 kPa, between 108.0 kPa to 122.0 kPa, between 100 kPa to 150 kPa, between 101.5 kPa to 170.0 kPa, or between 108.0 kPa to 136.0 kPa.

A safety relief valve may be positioned at the convex-shaped top section 130. The safety relief valve may be utilized to seal and unseal the sealable vessel 110. The safety relief valve may be operated automatically by the controller 164 in response to pressure signals. Steam pressure and positive pressure within the sealable vessel 110 may be released through the safety relief valve. The safety relief valve may also release a vacuum upon the internal space inside the sealable vessel 110 to allow atmospheric pressure back into the sealable vessel 110.

The amount of positive pressure applied to the internal space of the sealable vessel 110 may facilitate flow of the animal feed composition 162 out the dispense outlet 136. The positive pressure may be intermittently applied to dispense the animal feed composition 162 from the vessel as a plurality of aliquots. Alternatively, or in combination, the product outlet valve 138 may be intermittently opened and closed to dispense the animal feed composition 162 from the vessel as a plurality of aliquots. Each of the plurality of aliquots may be a quantifiable amount. Quantified amounts of the animal feed composition 162 may be dispensed directly from the sealable vessel 110 into final packaging 140. The quantified amounts may be measured by a reduction in weight of the contents of the sealable vessel based on readings by the load cells.

The product throughput of the sealable vessel 110 by operation under the automated system may be between 2.0 megagrams (Mg) per hour (h) to 4.0 Mg/h of animal feed composition 162. Other ranges of product throughput may include between 1.0 Mg/h to 4.0 Mg/h, between 0.5 Mg/h to 5.0 Mg/h, 1.0 Mg/h to 10.0 Mg/h, or between 0.1 Mg/h to 1.0 Mg/h.

Figure 2:
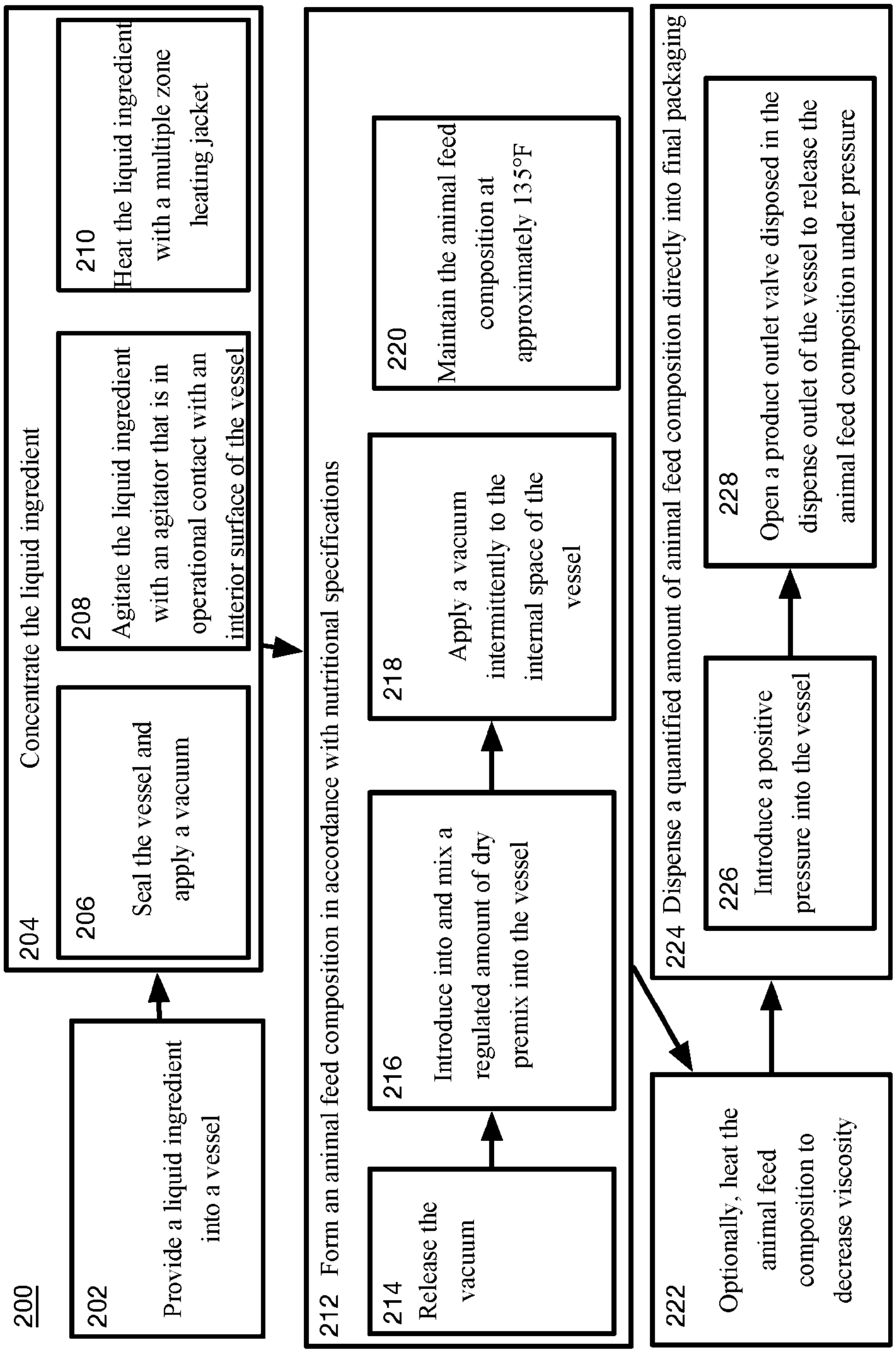
FIG. 2 depicts a flowchart for a method of manufacturing an animal feed composition.

A flowchart for method 200 for manufacturing an animal feed supplement is shown in FIG. 2. The liquid ingredient mixture is provided into a vessel, according to step 202. The liquid ingredient mixture is concentrated, according to step 204. Step 204 comprises the following substeps: a high vacuum is applied, according to step 206; the liquid ingredient mixture is agitated with an agitator that is in operational contact with an interior surface of the vessel, according to step 208; and the liquid ingredient mixture is heated with a multiple zone heating jacket, according to step 210. The animal feed composition is formed from the concentrated liquid mixture in accordance with nutritional specifications, according to step 212. Step 212 comprises the following substeps: the high vacuum is released, according to step 214; a regulated amount of premix is introduced into and mixed with the concentrated liquid mixture within the vessel, according to step 216; a high vacuum is intermittently applied to the internal space of the vessel, according to step 218; and the animal feed composition is maintained at approximately 135° F., according to step 220. Optionally, the animal feed composition is heated to decrease viscosity, according to step 222. A quantified amount of the animal feed composition is dispensed directly into final packaging by regulating a product outlet valve positioned at the dispense outlet of the vessel, according to step 224. Optionally, a prescribed amount of positive pressure is introduced within the sealable vessel, according to step 226. The product outlet valve is opened and closed to regulate the release of a quantified amount of the animal feed composition from the sealable vessel, which may be pressurized, according to step 228.

Figure 3:
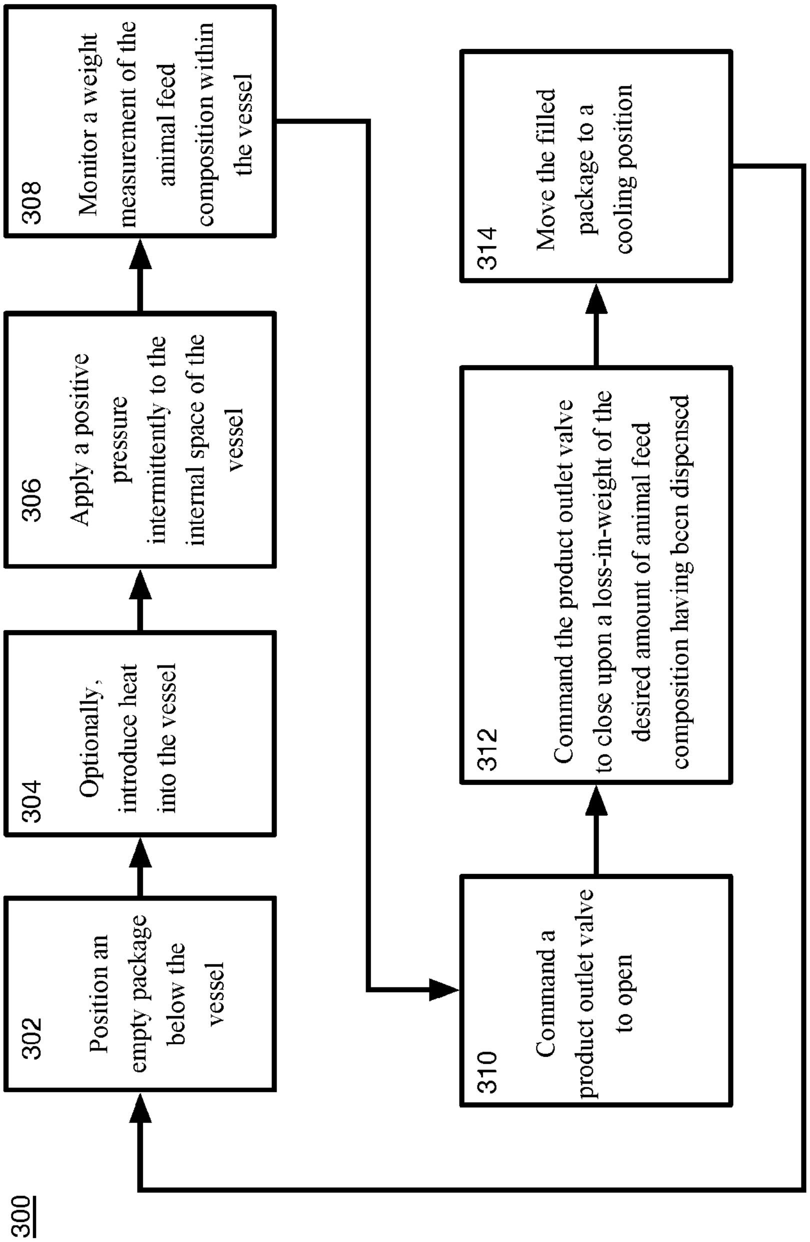
FIG. 3 depicts a flowchart for a method of packaging an animal feed composition.

A flowchart for method 300 for dispensing a viscous animal feed composition, as shown in FIG. 3. An empty package is positioned below the sealable vessel, according to step 302. Optionally, heat is introduced into the sealable vessel, according to step 304. A positive pressure is applied to the internal space of the sealable vessel, according to step 306. A weight measurement of the animal feed composition within the sealable vessel is monitored, according to step 308. A product outlet valve positioned at a dispense outlet of the sealable vessel is commanded to open, according to step 310. The product outlet valve is then commanded to close upon a loss-in-weight of the animal feed composition that corresponds to the predetermined amount of animal feed composition to be dispensed, according to step 312. The filled package is moved to a cooling position, according to step 314. The method repeats when a second empty package is positioned below the sealable vessel.

Viscosity of the animal feed composition depends on temperature and moisture percentages. Product viscosities may be correlated with viscosity curves related to the ingredients selected for manufacture of the feed supplement. Changes of 0.5% in the moisture content can dramatically increase the viscosity of the final feed supplement product. Features of the automated system 100 aid in reduction of the animal feed composition with little to no adverse effects from non-enzymatic browning reactions. In addition, the highly viscous products may be effectively dispensed from sealable vessel 110.

It is understood that the invention is not confined to the particular construction and arrangement of parts herein described. That although the drawings and specification set forth a preferred embodiment, and although specific terms are employed, they are used in a description sense only and embody all such forms as come within the scope of the following claims.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims.

For the convenience of the reader, the above description has focused on a representative sample of all possible embodiments, a sample that teaches the principles of the invention and conveys the best mode contemplated for carrying it out. Throughout this application and its associated file history, when the term “invention” is used, it refers to the entire collection of ideas and principles described; in contrast, the formal definition of the exclusive protected property right is set forth in the claims, which exclusively control. The description has not attempted to exhaustively enumerate all possible variations. Other undescribed variations or modifications may be possible. Where multiple alternative embodiments are described, in many cases it will be possible to combine elements of different embodiments, or to combine elements of the embodiments described here with other modifications or variations that are not expressly described. A list of items does not imply that any or all of the items are mutually exclusive, nor that any or all of the items are comprehensive of any category, unless expressly specified otherwise. In many cases, one feature or group of features may be used separately from the entire apparatus or methods described. Many of those undescribed variations, modifications and variations are within the literal scope of the following claims, and others are equivalent.

We claim:

1. An automated method for making an animal feed block comprising the steps of:

concentrating a liquid ingredient within a sealable vessel to form a concentrated liquid ingredient by:

agitating the liquid ingredient within the sealable vessel;

applying a vacuum to the sealable vessel such that an internal pressure within the sealable vessel is between 74.5 kilopascals to 98.0 kilopascals; and heating the liquid ingredient within the sealable vessel such that a temperature of the liquid ingredient is between 50° Celsius to 75° Celsius; and mixing a dry premix with the concentrated liquid ingredient to form an animal feed composition within the sealable vessel.

2. The automated method of claim 1, further comprising the step of:

maintaining the temperature of the liquid ingredient between 50° Celsius to 75° Celsius and the internal pressure within the sealable vessel between 74.5 kilopascals to 98.0 kilopascals for the duration of the step of concentrating.

3. The automated method of claim 1, further comprising the step of:

maintaining the internal pressure within the sealable vessel between 74.5 kilopascals to 93.5 kilopascals for the duration of the step of concentrating.

4. The automated method of claim 1, further comprising the step of:

continuing the step of concentrating until the liquid ingredient within the sealable vessel has undergone a predetermined reduction in weight of between 15% to 85%.

5. The automated method of claim 1, further comprising the steps of:

monitoring, by a controller, a weight of the liquid ingredient until the weight corresponds to a target weight value of the concentrated liquid ingredient based on a target moisture percentage for the concentrated liquid ingredient; and ending, by the controller, the step of concentrating when the weight of the concentrated liquid ingredient reaches the target weight value.

6. The automated method of claim 1, further comprising the step of:

releasing the vacuum prior to addition of the dry premix.

7. The automated method of claim 1, further comprising the step of:

applying the vacuum, intermittently during the step of mixing, for periods of between ten seconds to sixty seconds.

8. The automated method of claim 7, further comprising the step of:

adding the dry premix into the sealable vessel by gravity between the intermittent applications of vacuum based on a predetermined reduction in weight of the concentrated liquid ingredient.

9. The automated method of claim 1, further comprising the step of:

heating the animal feed composition to between 60° Celsius to 90° Celsius.

10. The automated method of claim 1, further comprising the step of:

applying a positive pressure between 7 kilopascals to 70 kilopascals above ambient pressure outside the sealable vessel; and dispensing, under positive pressure, a quantified amount of the animal feed composition directly from the sealable vessel into final packaging disposed below the sealable vessel based on weight readings of the animal feed composition in the sealable vessel.

11. The automated method of claim 1, further comprising the step of:

opening and closing of a product outlet valve of the sealable vessel based on a reduction in weight of the animal feed composition in the sealable vessel.

12. The automated method of claim 1, wherein a primary component of the animal feed composition is a grain-based byproduct having an initial moisture content between 45% to 75%.

13. An automated method for making an animal feed block comprising the steps of:

concentrating a liquid ingredient within a sealable vessel to form a concentrated liquid ingredient by:

agitating the liquid ingredient within the sealable vessel;

applying a vacuum to the sealable vessel; and heating the liquid ingredient within the sealable vessel;

mixing a dry premix with the concentrated liquid ingredient to form an animal feed composition within the sealable vessel; and applying a positive pressure to the animal feed composition within the sealable vessel.

14. The automated method of claim 13, wherein an internal pressure within the sealable vessel is between 74.5 kilopascals to 98.0 kilopascals and a temperature of the liquid ingredient is between 50° Celsius to 75° Celsius during the step of concentrating.

15. The automated method of claim 13, further comprising the step of:

continuing the step of concentrating until the liquid ingredient has undergone a predetermined reduction in weight of between 15% to 85%.

16. The automated method of claim 13, wherein an internal pressure within the sealable vessel is between 7 kilopascals to 70 kilopascals above ambient pressure outside the sealable vessel during the step of applying the positive pressure.

17. The automated method of claim 16, further comprising the step of:

releasing the positive pressure intermittently based on a reduction in weight of the animal feed composition in the sealable vessel.

18. The automated method of claim 13, further comprising the step of:

regulating a product outlet valve disposed in the sealable vessel to dispense the animal feed composition in a plurality of aliquots based on a reduction in weight of the animal feed composition in the sealable vessel.

19. The automated method of claim 13, further comprising the step of:

dispensing a quantified amount of the animal feed composition from the sealable vessel into final packaging disposed below the sealable vessel based on a reduction in weight of the animal feed composition in the sealable vessel.

20. The automated method of claim 13, wherein the liquid ingredient comprises between 40% to 100% by weight of a grain-based byproduct.

21. The automated method of claim 13, wherein the positive pressure is an internal gas pressure within the sealable vessel.

22. The automated method of claim 13, wherein the step of applying the positive pressure comprises:

introducing a compressed gas into the sealable vessel to increase an internal gas pressure within the sealable vessel above ambient pressure outside the sealable vessel and, intermittently, dispense a plurality of quantified amounts of the animal feed composition from the sealable vessel directly into final packaging based on a reduction in weight of the animal feed composition in the sealable vessel.

* * * * *